Feb. 20, 1962 R. L. LARSON ETAL 3,022,456
MOTOR VEHICLE ELECTRICAL SYSTEM
Filed Aug. 22, 1958 3 Sheets-Sheet 1

INVENTORS.
Robert L. Larson
Lewis R. Hetzler
BY
Their Attorney

INVENTORS.
Robert L. Larson
Lewis R. Hetzler
BY
Their Attorney

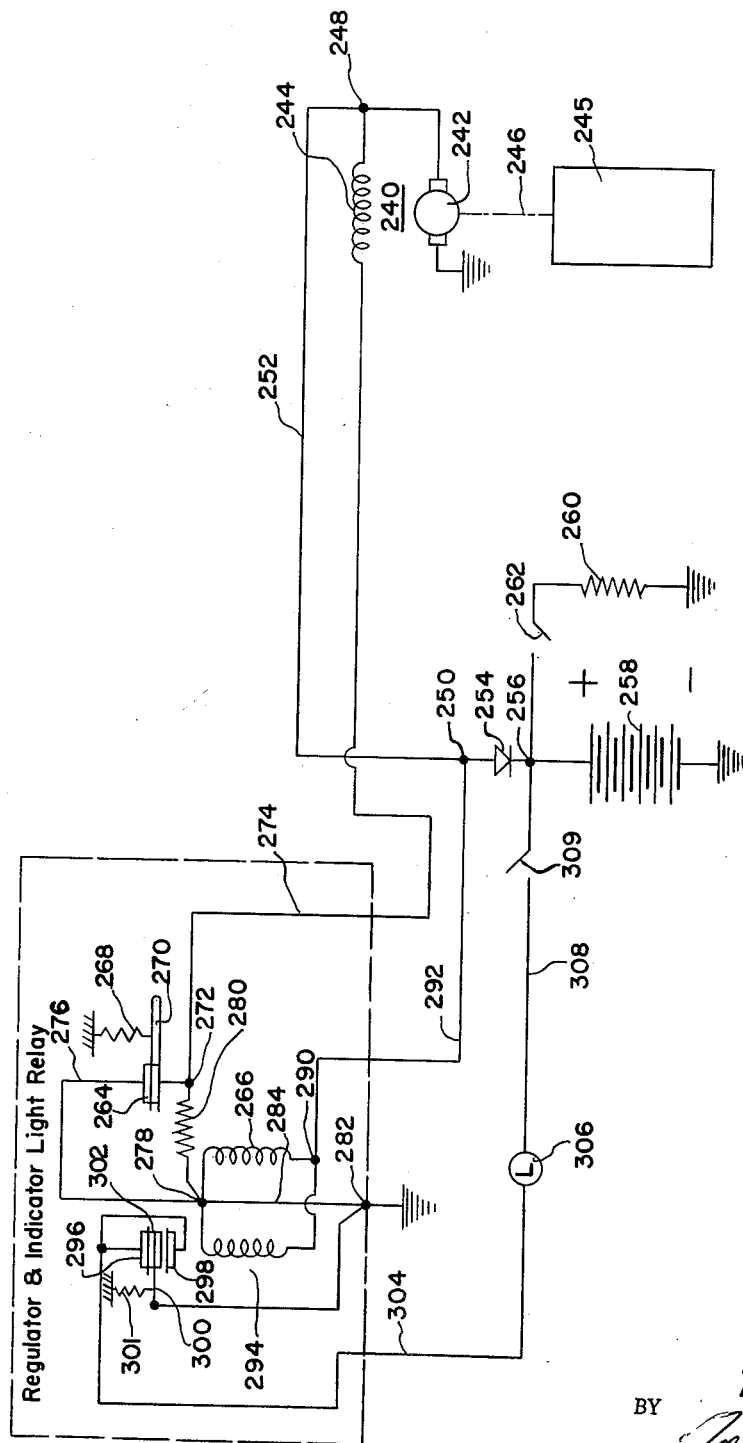

United States Patent Office 3,022,456
Patented Feb. 20, 1962

3,022,456
MOTOR VEHICLE ELECTRICAL SYSTEM
Robert L. Larson and Lewis R. Hetzler, Anderson, Ind., assignors to General Motors Corporation, Detroit, Mich., a corporation of Delaware
Filed Aug. 22, 1958, Ser. No. 756,648
8 Claims. (Cl. 322—28)

The invention relates to motor vehicle electrical systems and in particular to an indicating circuit for indicating conditions of operation of the electrical system.

It is an object of this invention to provide an indicating circuit that indicates certain conditions of operation of a motor vehicle charging circuit by using the level of voltage of a battery as a means of determining whether or not the charging system is functioning properly. This object is preferably accomplished by sensing the line voltage of the charging circuit and when the voltage sensed is below normal battery voltage level, an indicating device is energized to warn the operator of the vehicle that some part of the charging circuit is not functioning properly.

Another object of this invention is to provide an indicating circuit for the charging system of a motor vehicle that indicates both an under and an over voltage condition of the charging system.

Still another object of this invention is to provide an indicating circuit for a motor vehicle charging system wherein a rectifier is provided for preventing current flow from the battery to the generator during the time that the generator is not operating or when it is producing a voltage that is lower than battery voltage. The conventional cut out relay which includes the usual current coil is eliminated as a circuit element with this circuit.

A further object of this invention is to provide an indicating circuit for a motor vehicle charging system that includes a transistor for controlling the field current for the power source of the charging system. The indicator circuit includes means for indicating both an under and an over voltage condition and thus will indicate a shorted transistor. This is an important feature of this invention as prior indicating circuits using cut out relays and the like are ineffective to indicate a high voltage condition which may be the result of a shorted transistor.

Further objects and advantages of the present invention will be apparent from the following description, reference being had to the accompanying drawings wherein a preferred embodiment of the present invention is clearly shown.

FIGURE 3 is a circuit diagram of the indicator control circuit of this invention as applied to a motor vehicle charging system having an electromagnetic vibratory type of voltage regulator.

Figure 1:
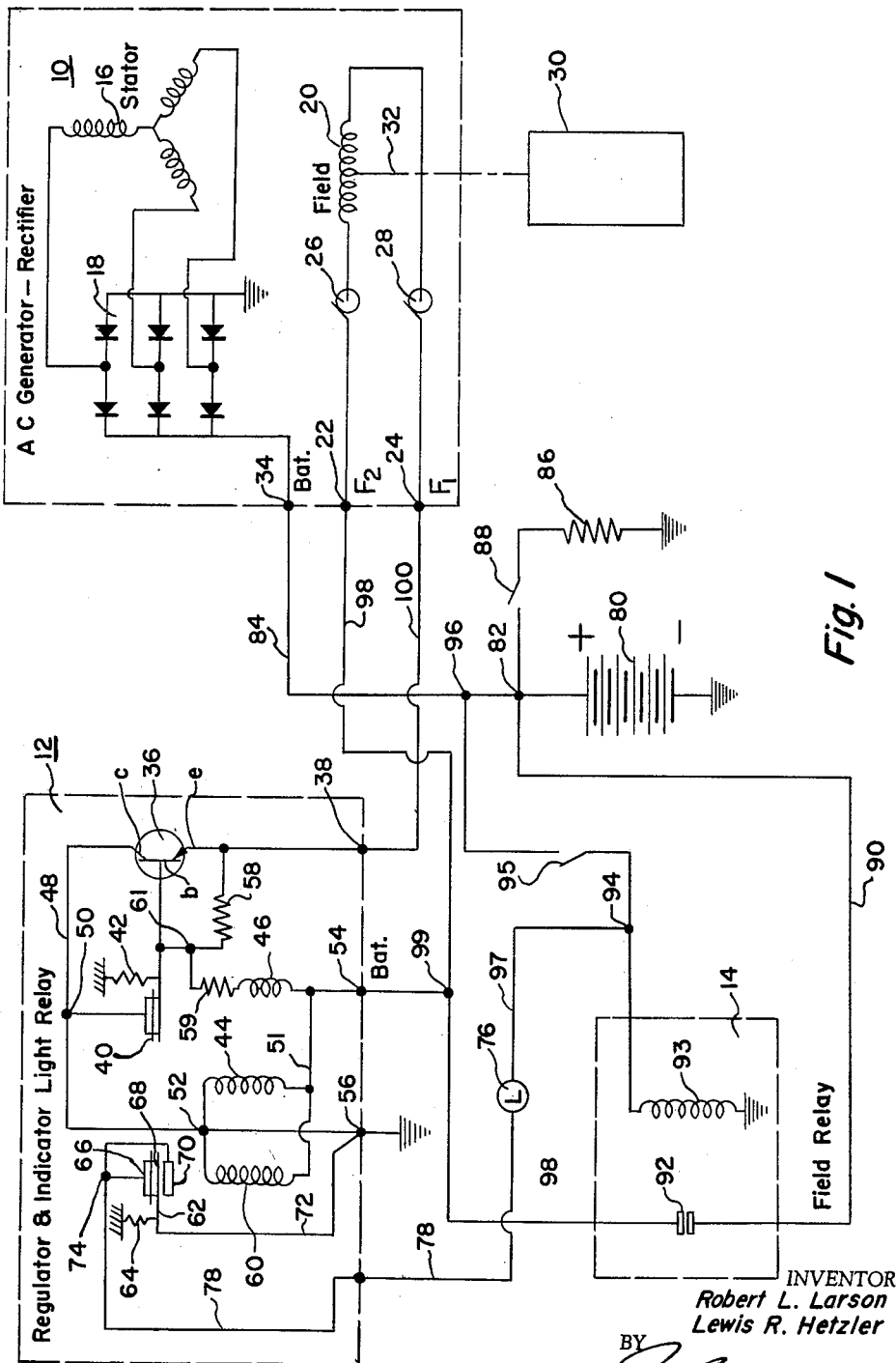
FIGURE 1 is a circuit diagram of the indicator control circuit of this invention as applied to a motor vehicle charging system that has a relay controlled transistor for controlling the power source of the system.

Referring now more particularly to FIGURE 1, the motor vehicle electrical circuit includes an A.C. generator-rectifier combination generally designated by reference numeral 10, a regulating and indicating light circuit generally designated by reference numeral 12 and a field relay designated by reference numeral 14. The A.C. generator has a three phase Y connected output winding or stator winding 16 which is connected with a three phase full wave bridge rectifier designated in its entirety by reference numeral 18. The field winding of the generator is designated by reference numeral 20 and it is seen that the field winding is connected with terminals 22 and 24 through slip rings 26 and 28. The field winding is rotatably driven by the internal combustion engine 30 of a motor vehicle through suitable torque transmitting means designated by reference numeral 32. One side of the bridge rectifier circuit 18 is connected directly to ground whereas the opposite side thereof is connected with terminal 34. It will be appreciated that the generator and rectifier circuit might take other equivalent forms well known to those skilled in the art.

The voltage regulating circuit of this invention includes a PNP transistor 36 having a base electrode $b$, a collector electrode $c$ and an emitter electrode $e$. The emitter electrode of the transistor is connected with terminal 38 while the base electrode is connected to one side of relay switch contacts 40 which are normally held closed by a spring 42 and which are magnetically opened by relay coil windings 44 and 46. The coil winding 44 is a main actuating coil winding whereas the coil winding 46 is an accelerating coil winding. The collector electrode of transistor 36 is connected with a lead 48 which is in turn connected with junctions 50 and 52. The main and accelerating windings of the relay are connected together by a lead 51 which is in turn connected with terminal 54. The junction 52 of the regulator circuit is connected with a terminal 56 which is connected directly to ground as shown. A pair of resistors 58 and 59 are connected together at junction 61. This junction is connected with the base electrode of transistor 36 whereas one side of the resistor 58 is connected with the emitter electrode of the transistor.

The regulator just described and its operation is more fully set forth in applicants' copending application, Ser. No. 756,686, filed concurrently herewith and assigned to the assignee of this invention.

The indicator light circuit of this invention includes a relay having an actuating coil 60 which magnetically operates an armature 62 against the force of spring 64. The relay further includes switch contacts 66, 68 and 70. The switch contact 68 is electrically connected with the armature 62 and carried thereby and is also connected with a lead 72 that is in turn connected with the grounded terminal 56. The switch contacts 66 and 70 are connected to the junction 74 and this junction is connected with one side of an indicator lamp 76 through lead 78.

The actuating coil 60 and spring 64 of the relay are so designed as to normally hold the contacts 68 and 66 in engagement with each other until the actuating coil is energized with a predetermined voltage. The relay is designed so that this voltage is just slightly greater than the terminal voltage of the storage battery 80 which forms a part of the electrical circuit. Thus, assuming that a 12 volt system is used, the contacts 66 and 68 will remain closed until a voltage is impressed across actuating coil 60 which just exceeds 12 volts. The relay is also designed to cause the closure of contacts 68 and 70 at some predetermined voltage. This voltage is selected to be of a value that is higher than the regulated output voltage of the rectifier 18. Thus by way of example if it is desired to maintain 14 volts across the charging circuit, the contacts 68 and 70 are designed to close only after the voltage appearing across the charging circuit exceeds 14 volts by some predetermined amount. The actuating coil 60, as will become more readily apparent hereinafter, is connected directly across the charging circuit and thus responds to the voltage appearing across the charging circuit.

The terminal 34 of the generator-rectifier combination is connected with a terminal 82 via a line 84. The terminal 82 is connected to one side of storage battery 80 while the opposite side of the storage battery is connected directly to ground. The terminal 82 is further connected with the electrical loads of the vehicle designated by reference numeral 86 through a switch 88. The opposite side of the electrical loads are connected directly to ground. A lead 90 connects the junction 82 with one side of relay contacts 92 which are normally maintained open and which are closed whenever relay actuating coil 93 is energized. One side of the relay coil 93 is connected directly to ground while the opposite side of the relay coil is connected with a junction 94 and with one side of an ignition switch 95. The opposite side of the ignition switch is connected with junction 96 and is thus connected with lead 84. One side of the indicator lamp 76 is connected with junction 94 via a lead 97. A lead 98 connects junctions 22 and 99 and is connected with terminal 54 of the voltage regulating circuit. The terminal 24 of the generator-rectifier is connected with terminal 38 of the voltage regulating circuit via a lead 100.

Assuming now that the ignition switch 95 is closed, the actuating coil 93 of field relay 14 is energized to close relay contacts 92. This applies battery voltage between terminal 54 and ground and when the generator is operating, the output voltage of the rectifier 18 is applied across the terminal 34 and ground which forms the charging circuit. The voltage appearing across the charging circuit is applied across the field winding 20 via a circuit that includes lead 84, junction 82, lead 90, relay switch contacts 92, lead 98, lead 100, terminal 38 and thence through the transistor emitter to collector circuit to ground. The conductance of the transistor 36 as is more particularly set forth in above-mentioned copending application Serial No. 756,686 is controlled by the application of voltage applied to the main actuating coil winding 44 and accelerating coil winding 46 of the relay. The coil windings 44 and 46 control the opening and closing relay contacts 40 which open and close a circuit for emitter to base current flow in transistor 36 with a consequent control of emitter to collector current in this transistor. The field current and output voltage of the alternator are thus controlled as a function of conductance of transistor 36 and the conductance of the transistor is in turn controlled by the voltage appearing across the charging circuit. This voltage wil be of some value greater than the terminal voltage of the battery and the voltage regulator will maintain this voltage at that level.

The voltage appearing between terminal 34 and ground is impressed directly across the actuating coil 60 of the indicator light relay. When this voltage is substantially equal to or below the terminal voltage of the battery, the contacts 66 and 68 are maintained closed to complete a circuit through indicator light 76 which may be traced via terminal 82, terminal 96, ignition switch 95, terminal 94, lead 97, lead 78, through the switch contacts 66 and 68, and thence directly to ground via lead 72. It, thus, is apparent that the indicator lamp, which may be mounted on the dashboard of a motor vehicle, will be incandescent when the voltage output of the generator rectifier is below or substantially equal to the terminal voltage of the battery 80. This indicates that there is some trouble in the battery charging circuit which may be in the generator-rectifier, the regulator, the wiring harness or in other parts of the circuit. If the system voltage appearing across terminal 34 and ground exceeds the voltage which is to be maintained at some predetermined level by the voltage regulating circuit, the coil 60 is energized sufficiently to close contacts 68 and 70 and thus apply a potential across the indicator lamp 76 to cause it to become incandescent. The indicator lamp will thus be lighted when the output voltage of rectifier 18 is below the terminal voltage of the battery and also will be lighted whenever charging circuit voltage is of some value higher than the voltage determined by the setting of the voltage regulator circuit.

When the voltage is higher than the voltage setting of the regulator circuit, the trouble indicated usually will be a shorted transistor or a wiring harness failure. The indicator circuit thus will indicate failures that cause an over voltage condition of operation of the charging circuit.

Figure 2:
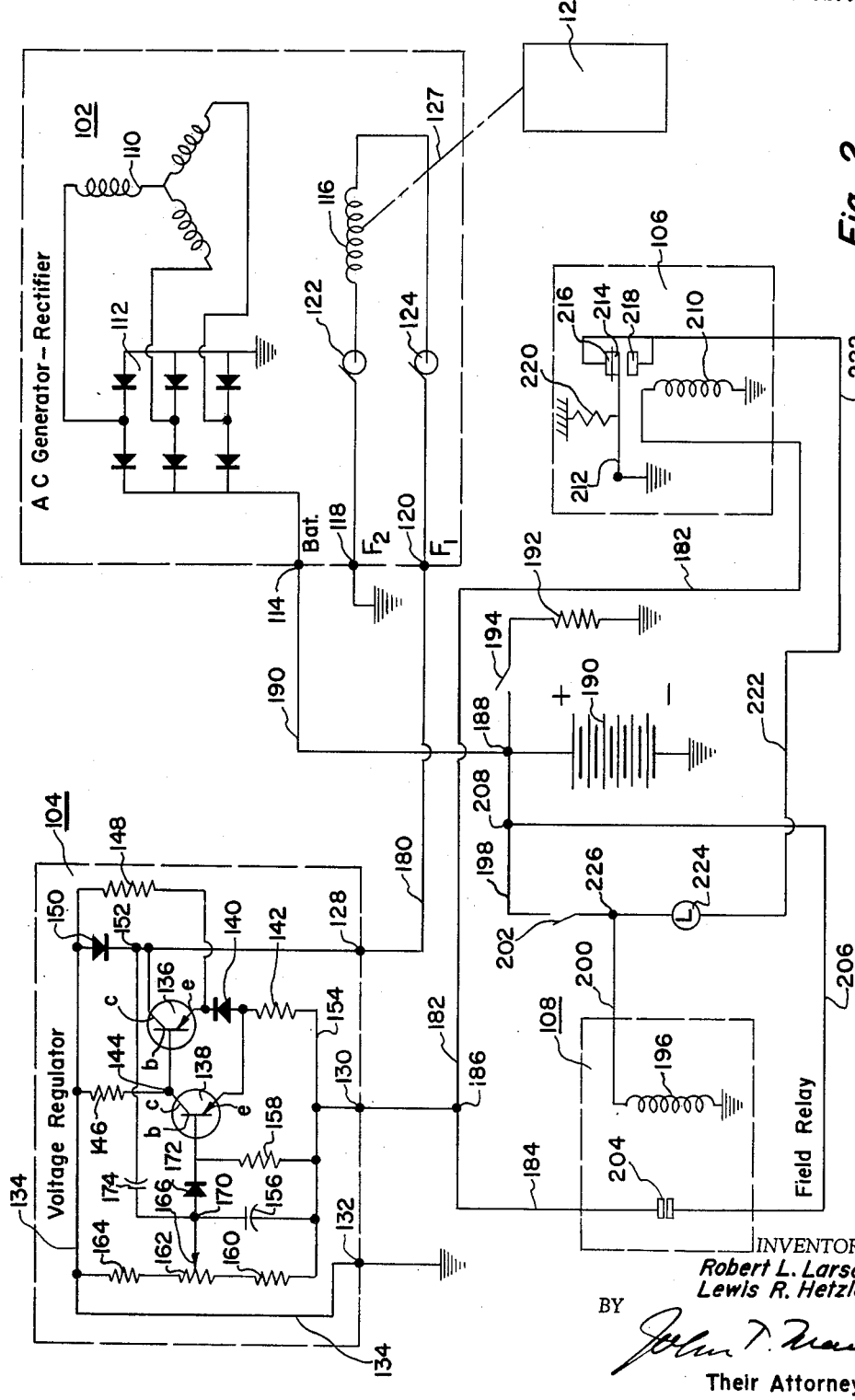
FIGURE 2 is a circuit diagram of the indicator control circuit of this invention as applied to a motor vehicle charging system that has a fully transistorized voltage regulating circuit for controlling the power source of the system.

Referring now more particularly to FIGURE 2, the indicator light circuit of this invention is shown applied to a circuit that contains a fully transistorized voltage regulator. In this circuit, an A.C. generator-rectifier circuit generally designated by reference numeral 102 is shown connected with a voltage regulator circuit 104, an indicator relay circuit 106 and a field relay circuit 108. The alternator-rectifier is identical with the alternator-rectifier illustrated in FIGURE 1 and has a three phase Y-connected output winding 110 which is connected with three phase full-wave bridge rectifier circuit 112. One side of the bridge rectifier circuit is grounded while the opposite side thereof is connected with terminal 114. The field winding 116 of the generator is connected with terminals 118 and 120 through slip rings 122 and 124. The field winding is preferably rotatably driven by an internal combustion engine 126 through suitable torque transmitting means 127. The terminal 118 of the generator-rectifier circuit is connected directly to ground as shown.

The voltage regulator circuit generally designated by reference numeral 104 is more fully described in application, Serial No. 756,685, filed concurrently herewith and assigned to the assignee of this inventon. Briefly, the voltage regulator includes terminals 128, 130 and 132. The terminal 132 is connected directly to ground and is also connected with lead 134 which is, therefore, at ground potential. The voltage regulator circuit includes transistors 136 and 138 of the PNP type, each having an emitter electrode $e$, a base electrode $b$ and a collector electrode $c$. The transistor 136 has its emitter electrode connected with a silicon diode 140 which is connected in series with resistor 142. The base electrode of transistor 136 is connected with junction 144 which is, in turn, connected with resistor 146 and the collector electrode of transistor 138. A resistor 148 is connected between the lead 134 and the emitter electrode of transistor 136. A diode 150 is connected between lead 134 and junction 152. The terminal 130 of the voltage regulating circuit is connected with lead 154 which forms a common connection for one side of condenser 156, resistor 158, resistor 160 and resistor 142. The resistor 160 forms a portion of a voltage divider network which is comprised of resistors 160, 162 and 164. This voltage dividing network is connected between leads 134 and 154 and the resistor 162 is tapped at 166. The resistor 162 is of a type wherein the tap point may be changed to adjust the voltage setting of the voltage regulating circuit. The tap point 166 is connected with a junction 170. A Zener diode 172 is connected between junction 170 and the base electrode of transistor 138. The Zener diode has the characteristic of breaking down in a reverse direction whenever a predetermined voltage is applied thereacross as is more fully described in above-mentioned application Serial No. 756,685. A condenser 174 is connected between junction 170 and junction 152. The terminal 120 of the generator-rectifier 102 is connected with terminal 128 of the voltage regulating circuit by means of a lead 180. The terminal 130 of the voltage regulating circuit 104 is connected with leads 182 and 184 at junction 186. The terminal 114 of the generator-rectifier is connected with junction 188 by means of a lead 190. The junction 188 is connected to one side of a storage battery 190 and to the electrical loads of the motor vehicle 192 through a switch 194. The opposite side of the storage battery and electrical loads are connected directly to ground as shown. The terminal 188 is also connected with one side of the actuating coil 196 of field relay 108 through leads 198 and 200 and through ignition switch 202. The opposite side of the actuating coil 196 is connected directly to ground and, when the actuating coil is energized with charging circuit voltage, the coil magnetically closes relay switch contacts 204. The relay switch contacts are connected between leads 184 and 206 with the lead 206 being connected to junction 208.

The indicating relay circuit 106 includes a relay having an actuating coil 210 which magnetically moves an armature 212. The armature carries an electrical contact 214 which cooperates with fixed contacts 216 and 218. The contacts 214 and 216 are normally held in engagement with one another by a spring 220. This relay, like the relay of FIGURE 1, is designed to maintain the contacts 214 and 216 in engagement when the voltage applied across the actuating coil 210 is substantially equal to or below the terminal voltage of the battery 190. This relay is also designed to cause the closure of switch contacts 214 and 218 and the opening of switch contacts 214 and 216 when the voltage applied across the actuating coil is greater than the desired voltage maintained by the voltage regulating circuit 104. When the voltage across the charging circuit is substantially equal to the desired regulating value, the contact 214 does not engage either of the contacts 216 or 218.

The armature 212 of the relay circuit 106 is connected directly to ground as is one side of the actuating coil 210. The switch contacts 216 and 218 are both connected with a lead 222 which is, in turn, connected with one side of an indicating lamp 224. The opposite side of indicating lamp is connected with a junction 226 that is, in turn, connected with a lead 200 and one side of an ignition switch 202. The actuating coil 210 is connected with junction 186 via the lead 182.

Assuming now that the ignition switch 202 is closed and that the alternator-rectifier is developing an output voltage between terminal 114 and ground, the field relay coil 196 will be energized to close switch contacts 204. This relay coil, of course, will be energized immediately upon closure of the ignition switch by reason of its connection with the battery 190. With the relay switch contacts 204 closed, a circuit may be traced for the field winding 116 via terminal 114, lead 190, junction 208, lead 206, contacts 204, lead 184, junction 186, junction 130, through resistor 142 and silicon diode 140, through the emitter to collector circuit of transistor 136, and thence through junction 128 to lead 180, and from lead 180 through the field winding 116 to ground. It will be appreciated that the field current will be controlled as a function of emitter to collector conductance of transistor 136, the output voltage of the alternator increasing with increased conductance and the output voltage decreasing upon decreased conductance of the transistor. The transistor 136, as is more fully described in copending application, Ser. No. 756, 685 is controlled by the conduction of transistor 138. The transistor 138 has its conduction controlled by the breakdown of the Zener diode 172 which responds to the voltage applied across tap point 166 and lead 154. The voltage appearing across tap point 166 and lead 154 is, of course, a function of the charging circuit voltage and when this voltage increases, the transistor 136 is operated in its nonconductive state to cut down field current whereas, when the voltage between tap point 166 and lead 154 decreases below a pre-set regulated value, the transistor 136 is operated in a substantially fully conductive mode in order to increase field current. The transistorized regulator circuit 104 will thus operate to maintain the voltage between terminal 114 and ground at a value that is somewhat higher than the terminal voltage of the battery 190 in order that the battery will be charged from the power source. As has been noted above, in a 12-volt system, the regulated voltage may be maintained in the neighborhood of 14 volts.

The voltage appearing across the terminal 114 and ground is impressed across the actuating coil 210 of the indicator light relay circuit 106. When this voltage is substantially equal to or lower than battery voltage, a faulty condition in the charging circuit is indicated by the indicator light 224. This indicator light will be incandescent at this time because of the closure of contacts 214 and 216. This circuit may be traced from terminal 188 through ignition switch 202 through the indicator light 224, through lead 222 and thence through contacts 214 and 216 to ground. When the output voltage of the rectifier 112 is at the normal regulated value, the relay coil 210 is energized sufficiently to open contacts 214 and 216, thus breaking the circuit for the indicator light and extinguishing it. On the other hand, as the voltage between terminal 114 and ground exceeds the normal regulated value by a certain predetermined amount, the contacts 214 and 218 are closed to once more complete an energizing circuit for the indicator lamp 224. It thus is apparent that the circuit of FIGURE 2, like that of FIGURE 1, will indicate both an under voltage and an over voltage condition of operation of the charging circuit.

Referring now more particularly to FIGURE 3, the indicator light circuit of this invention is shown applied to an electrical circuit having a relay of the well-known electromagnetic vibratory type. In this circuit, a direct current generator generally designated by reference numeral 240 has an armature 242 and a shunt field winding 244. The armature is driven by an internal combustion engine 245 through suitable torque transmitting means 246. One side of the armature is shown connected directly to ground while the opposite side thereof is connected to one side of field winding 244 at junction 248. The junction 248 is connected with a junction 250 via lead 252. The junction 250 is also connected with a silicon diode 254 poled in such a direction as to pass current between junction 250 and junction 256. The junction 256 is connected with one side of storage battery 258 and with the electrical loads of the motor vehicle designated by reference numeral 260. An electrical switch 262 is connected between junction 256 and the electrical load 260.

The voltage regulating circuit of this invention includes the conventional magnetically operated contacts 264 that are magnetically opened by an actuating coil 266 and which are normally maintained closed by a spring 268. The lower of the contacts 264 moves with the armature 270 of the voltage regulating relay. One side of the field winding 244 is connected with junction 272 via lead 274. The junction 272 is connected to one side of contacts 264 and the opposite side of the contacts are connected with a lead 276 which extends between the contacts and a junction 278. A regulating resistor 280 is connected between junctions 272 and 278 and is connected with junction 282 via lead 284. The actuating coil 266 is connected between junction 278 and junction 290. A lead 292 connects the junctions 250 and 290.

The indicating light relay in the circuit of FIGURE 3 is identical with the indicating light relay of FIGURES 1 and 2 and includes an actuating coil 294, relay switch contacts 296 and 298, and an armature 300 which carries contact 302. The contacts 296 and 302 are normally held closed by a spring 301. The contacts 298 and 296 are connected together and to a lead 304 which is connected with one side of an indicating lamp 306. The opposite side of indicating lamp 306 is connected with a junction 256 via a lead 308 and ignition switch 309.

In the circuit of FIGURE 3, the contacts 264 are normally maintained closed to provide a circuit for the field winding 244 of the generator through lead 274, switch contacts 264, lead 276 to junction 278, and from junction 278 to ground. When the voltage across the charging circuit, which is also impressed actuating coil 266, is above a predetermined desired value, the contacts 264 are open to place resistor 280 in series with the field circuit of the generator as is well known to those skilled in the art. The contacts are thus opened and closed at a rapid rate when voltage regulating is required to maintain the terminal voltage of the direct current generator 242 at some predetermined value that is greater than the battery terminal voltage.

When the terminal voltage of the generator for any reason becomes substantially equal to or below the terminal voltage of the battery, the contacts 296 and 302 are maintained in engagement in order to complete a circuit for indicator lamp 306 from terminal 256 to ground. When the terminal voltage of the generator is at its proper regulated value, the actuating coil 294 is energized sufficiently to open contacts 296 and 302 to break the circuit to the indicator lamp 306. If the voltage for some reason should exceed the normal regulated value, the coil 294 becomes energized sufficiently to close contacts 298 and 302 in order to once more complete a circuit for indicating lamp 306. The circuit of FIGURE 3 like that of FIGURES 1 and 2 thus operates to indicate an under and an over voltage condition of operation of the charging circuit. It will be appreciated that a suitable current regulating device could be used with the circuit of FIGURE 3 to regulate output current and that the rectifier 254 prevents reverse current flow between the battery 258 and the generator 240.

While the embodiments of the present invention as herein disclosed constitute preferred forms, it is to be understood that other forms might be adopted.

What is claimed is as follows:

1. In a motor vehicle electrical system, the combination comprising; a direct current power source having output terminals connected with a charging circuit and having a control winding, voltage regulating means connected in circuit with said control winding and said charging circuit for controlling current flow through the control winding as a function of the voltage appearing across said charging circuit, a control device connected across said charging circuit to be responsive to voltage appearing across said charging circuit, an indicator device, and means for operating said indicator device from said control device whenever the voltage applied to said control device is of a value higher than the battery voltage by a predetermined amount and higher than the voltage setting of said voltage regulating means.

2. In a motor vehicle electrical system, the combination comprising; a direct current power source having output terminals connected with a charging circuit and having a control winding, a storage battery connected across said charging circuit to be charged thereby, voltage regulating means connected in circuit with said control winding and charging circuit for maintaining the output voltage of said power source at a predetermined value which is greater than said battery voltage, an indicator device, and means for actuating said indicating device when the output voltage of said power source is substantially equal to or below said battery voltage and when the output voltage of the power source is above the voltage setting of said voltage regulating means.

3. In a motor vehicle electrical system, the combination comprising; a direct current power source having output terminals connected with a charging circuit and having a control winding, a storage battery connected across said charging circuit to be charged thereby, voltage regulating means connected in circuit with said control winding and charging circuit for maintaining the output voltage of said power source at a predetermined value which is greater than battery voltage, an indicator lamp, a relay having an actuating coil and a pair of switch contacts, said relay maintaining said switch contacts normally open and closing said switch contacts when a voltage is impressed across the actuating coil which exceeds the voltage setting of the voltage regulating means by a predetermined amount, means connecting said indicator lamp in series with said relay switch contacts and across said charging circuit, and means connecting said relay actuating coil across said charging circuit.

4. In a motor vehicle electrical system, the combination comprising; a direct current power source having output terminals connected with a charging circuit and having a control winding, a storage battery connected across said charging circuit to be charged thereby, voltage regulating means connected in circuit with said control winding and charging circuit for maintaining the output voltage of said power source at a predetermined value which is greater than battery voltage, an indicator lamp, a relay having an actuating coil and a movable armature, a pair of electric switches closed and opened by movement of said armature, said relay maintaining one of said switches closed when the voltage impressed across the actuating coil is substantially equal to or less than battery voltage and opening said switch when the voltage impressed on said actuating coil is greater than battery voltage, said relay maintaining said other switch normally open and closing said other switch when the voltage impressed across said actuating coil is above the voltage setting of the voltage regulating means by a predetermined amount, means connecting said indicating lamp and one of said switches in series across said charging circuit, means connecting said indicating lamp and said other switch in series across said charging circuit, and means connecting said relay actuating coil across said charging circuit.

5. In a motor vehicle electrical system, the combination comprising; a direct current power source having output terminals connected with a charging circuit and having a control winding, voltage regulating means including a transistor connected in series with said control winding and across said charging circuit for maintaining the output voltage of said source at a predetermined level, a storage battery connected across said charging circuit, and means for indicating when the output voltage of said source is below battery voltage and when said output voltage is above the voltage level setting of said voltage regulator means by a predetermined amount.

6. In a motor vehicle electrical system, the combination comprising; a direction current power source having output terminals connected with a charging circuit and having a control winding, voltage regulating means including a transistor connected in series with said control winding and across said charging circuit for maintaining the output voltage of said source at a predetermined level, a storage battery connected across said charging circuit, an indicator lamp, and means for impressing a potential difference across said indicator lamp when the output voltage of said source exceeds the voltage level setting of said voltage regulating means by a predetermined amount.

7. In a motor vehicle electrical system, the combination comprising; an A.C. generator having an output winding and a field winding, a charging circuit, a rectifier connected between said output winding and said charging circuit for applying direct current across said charging circuit, a storage battery connected across said charging circuit, voltage regulating means including a transistor connected in series with said field winding and across said charging circuit for maintaining the voltage appearing across said charging circuit at some predetermined level higher than battery voltage, an indicator lamp, and means for applying a potential difference across said indicator lamp when the voltage appearing across said charging circuit is above the level of voltage maintained by said voltage regulating means.

8. In a motor vehicle electrical system, the combination comprising; an A.C. generator having an output winding and a field winding, a charging circuit, a rectifier connected between said output winding and said charging circuit for applying direct current across said charging circuit, a storage battery connected across said charging circuit, voltage regulating means including a transistor connected in series with said field winding and across said charging circuit for maintaining the voltage appearing across said charging circuit at some predetermined level higher than battery voltage, an indicator lamp, and means for applying a potential difference across said indicator lamp when the voltage appearing across said charging circuit is below the terminal voltage of the battery and when the voltage appearing across the charging circuit is above the level of voltage maintained by said voltage regulating means.

References Cited in the file of this patent

UNITED STATES PATENTS

| | | |
|---|---|---|
| 1,936,692 | Stoller | Nov. 28, 1933 |
| 2,179,962 | Scott | Nov. 14, 1939 |
| 2,809,301 | Short | Oct. 8, 1957 |
| 2,817,830 | Raver | Dec. 24, 1957 |
| 2,862,175 | Guyton | Nov. 25, 1958 |